(12) United States Patent
Tupper

(10) Patent No.: US 7,827,903 B2
(45) Date of Patent: Nov. 9, 2010

(54) FLUID OPERATED DEVICE WITH IMPROVED SEAL VALVE

(75) Inventor: Myron D. Tupper, Boring, OR (US)

(73) Assignee: LatchTool Group LLC, Colorado Springs, CO (US)

( * ) Notice: Subject to any disclaimer, the term of this patent is extended or adjusted under 35 U.S.C. 154(b) by 426 days.

(21) Appl. No.: 11/905,440

(22) Filed: Oct. 1, 2007

(65) Prior Publication Data

US 2008/0079221 A1    Apr. 3, 2008

Related U.S. Application Data

(60) Provisional application No. 60/848,398, filed on Oct. 2, 2006.

(51) Int. Cl.
*F16J 9/00* (2006.01)
*F16J 9/08* (2006.01)
*F15B 13/04* (2006.01)

(52) U.S. Cl. .............................. 92/247; 92/254; 91/422

(58) Field of Classification Search ................. 60/591; 91/222, 224, 422; 92/181 P, 183, 247, 254; 277/440, 442, 535, 538, 540, 654
See application file for complete search history.

(56) References Cited

U.S. PATENT DOCUMENTS 3,027,877 A    4/1962    Lansky

| 3,493,645 | A |   | 2/1970  | Sanderson et al. |
|-----------|---|---|---------|------------------|
| 3,944,306 | A | * | 3/1976  | Neilson ........................ 384/94 |
| 4,189,191 | A | * | 2/1980  | Margetts et al. ............... 60/591 |
| 5,096,347 | A | * | 3/1992  | Kumagai et al. ............... 92/183 |
| 5,473,896 | A | * | 12/1995 | Bergelin et al. ................ 91/422 |
| 5,826,681 | A | * | 10/1998 | Kubo et al. ................. 188/71.8 |
| 5,992,948 | A |   | 11/1999 | Gowda |
| 6,341,621 | B1 |  | 1/2002  | Tupper et al. |
| 6,543,785 | B1 | * | 4/2003 | Katayama et al. ........... 277/654 |

\* cited by examiner

*Primary Examiner*—Michael Leslie
(74) *Attorney, Agent, or Firm*—Manelli Denison & Selter PLLC; Edward J. Stemberger

(57) ABSTRACT

A seal valve arrangement is provided for a hydraulic device (10). The hydraulic device has an inner bore (14). The seal valve arrangement includes an element (45) disposed in the bore. The element is constructed and arranged to define a fluid passage (47) so fluid can move from one side thereof to a side opposite the one side. An elastomer seal member (39) is adjacent to the fluid passage and to a seal portion (r) of the element. A spring member (41) biases the seal member to engage the portion (r) to maintain sealing of the fluid passage under certain fluid pressure conditions, and under different fluid pressure conditions, permits the seal member disengage from the portion of the element to open the fluid passage. A tipping point is disclosed as a point when a fluid pressure condition alone causes the seal member (39) to fully engage the portion of the element and fully seal the fluid passage.

20 Claims, 4 Drawing Sheets

US 7,827,903 B2

FLUID OPERATED DEVICE WITH IMPROVED SEAL VALVE

This application claims the benefit of priority from U.S. Provisional Application No. 60/848,398, filed on Oct. 2, 2006, the content of which is hereby incorporated by reference into this specification.

FIELD OF THE INVENTION

The invention relates to fluid operated devices such as hand tools and, more particularly, to a seal valve structure within the device.

BACKGROUND OF THE INVENTION

U.S. Pat. No. 6,341,621 discloses a hydraulic tool that uses an O-ring as a check valve in the tool. The purpose of any check valve is to prevent fluid back flow. When using an O-ring as a check valve, there is a tipping point, e.g., a point that is reached where backpressure alone on the O-ring will close the check valve. This tipping point is dependent on several variables in the geometry of the valve seat.

There is a need to control the tipping point of an O-ring type check valve.

SUMMARY OF INVENTION

An object of the invention is to fulfill the need referred to above. In accordance with the principles of the present invention, this objective is achieved by providing a seal valve arrangement for a hydraulic device. The hydraulic device has surfaces defining an inner bore. The seal valve arrangement includes an element disposed in the bore. The element is constructed and arranged to define a fluid passage so fluid can move from one side thereof to a side opposite the one side. An elastomer seal member is disposed generally adjacent to the fluid passage and to a seal portion of the element. A spring member biases the seal member to engage the seal portion of the element to maintain sealing of the fluid passage under certain fluid pressure conditions, and under different fluid pressure conditions, permits the seal member disengage from the seal portion of the element to open the fluid passage to permit fluid to flow there-through. A tipping point is defined as a point when a fluid pressure condition alone causes the seal member to fully engage the seal portion of the element and fully seal the fluid passage. The tipping point is determined by the following relationships:

$$(\cos \alpha / \sin \alpha) = (Fs - N^*f)/N, \text{ and}$$

$$R = N/\sin \alpha$$

wherein:
N—a normal force of the seal member against the inner bore
f—a coefficient of friction
Fs—a force of the spring member on the seal member
α—an angle to the portion of the element
R—a resultant of vector forces at the portion of the element.

In accordance with another aspect of the invention, a seal member includes a core having a certain hardness and an outer layer over the core, the outer layer having a hardness that is softer than the certain hardness.

In accordance with yet another aspect of the invention, a method of ensuring sealing of a fluid passage in a hydraulic device is provided. The hydraulic device has surfaces defining an inner bore. The method provides an element in the bore. The element defines a fluid passage in the bore so fluid can move from one side of the element to another side of the element. An elastomer seal member is generally adjacent to the fluid passage and to a seal portion of the element. The seal member is biased so as to engage the seal portion of the element to maintain sealing of the fluid passage under certain fluid pressure conditions, and under different fluid pressure conditions, the seal member is permitted to disengage from the seal portion of the element to open the fluid passage to permit fluid to flow there-through. A tipping point is defined as a point when a fluid pressure condition alone causes the seal member to fully engage the seal portion of the element and fully seal the fluid passage. The method further includes determining the tipping point by the following relationships:

$$(\cos \alpha / \sin \alpha) = (Fs - N^*f)/N, \text{ and}$$

$$R = N/\sin \alpha$$

wherein:
N—a normal force of the seal member against the inner bore
f—a coefficient of friction
Fs—a force of the spring member on the seal member
α—an angle to the portion of the element
R—a resultant of vector forces at the portion of the element.

Other objects, features, functionality and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawing, in which.

DETAILED DESCRIPTION OF THE PREFERRED EXEMPLARY EMBODIMENT

Figure 1:
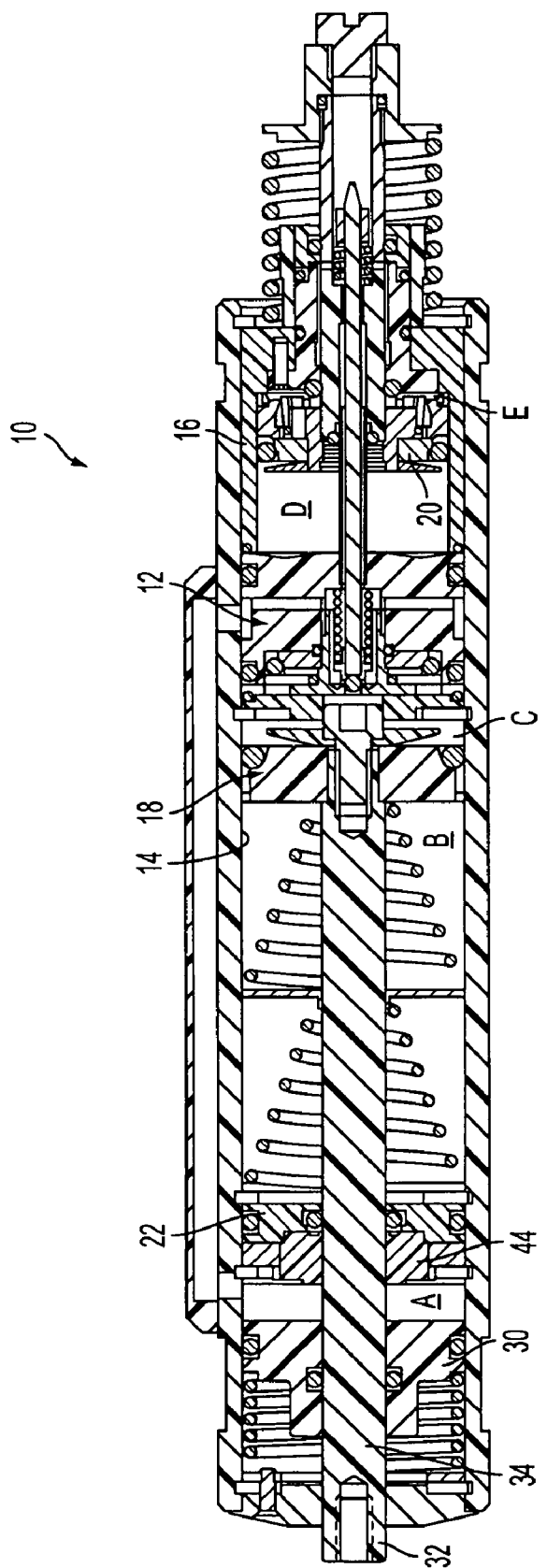
FIG. 1 is a cross-sectional view of a fluid operated device provided in accordance with the principles of an embodiment of the present invention.

FIG. 1 is a sectional view of a fluid operated device, generally indicted at 10, provided in accordance with the principles of an embodiment of the present invention. The device 10 is of the type disclosed in U.S. Pat. No. 6,341,621, the content of which is hereby incorporated into the present specification by reference. In particular, the device 10 includes a cylindrical bulkhead, generally indicated at 12, is disposed within an interior bore 14 of a unitary cylindrical housing 16. Interior bore 14 encloses a ram piston assembly, generally indicated at 18, driven by pressurized fluid and a pump piston 20 for developing this pressure. The cylindrical housing, piston, and ram could be of square, hexagonal or other cross-section if desired. Furthermore, the housing 16 may be composed of separate housings, such as, a pump housing and a ram piston housing.

In the illustrated embodiment, interior bore 14 is subdivided into a pumping chamber D, a driving chamber C, a pump reservoir chamber E, a ram reservoir chamber B and an accumulator chamber A. The chambers A, B and E receive and dispense fluid displaced during operation of the device 10. A barrier assembly 22, fixed in the housing 16, separates chamber A and chamber B. The accumulator chamber A is defined by surfaces of the housing 16, of a surface of the barrier assembly 22, and of a surface of an accumulator piston 30.

The overall function of the device 10 are described in the incorporated U.S. Pat. No. 6,341,621 and thus need not be repeated here.

Figure 2:
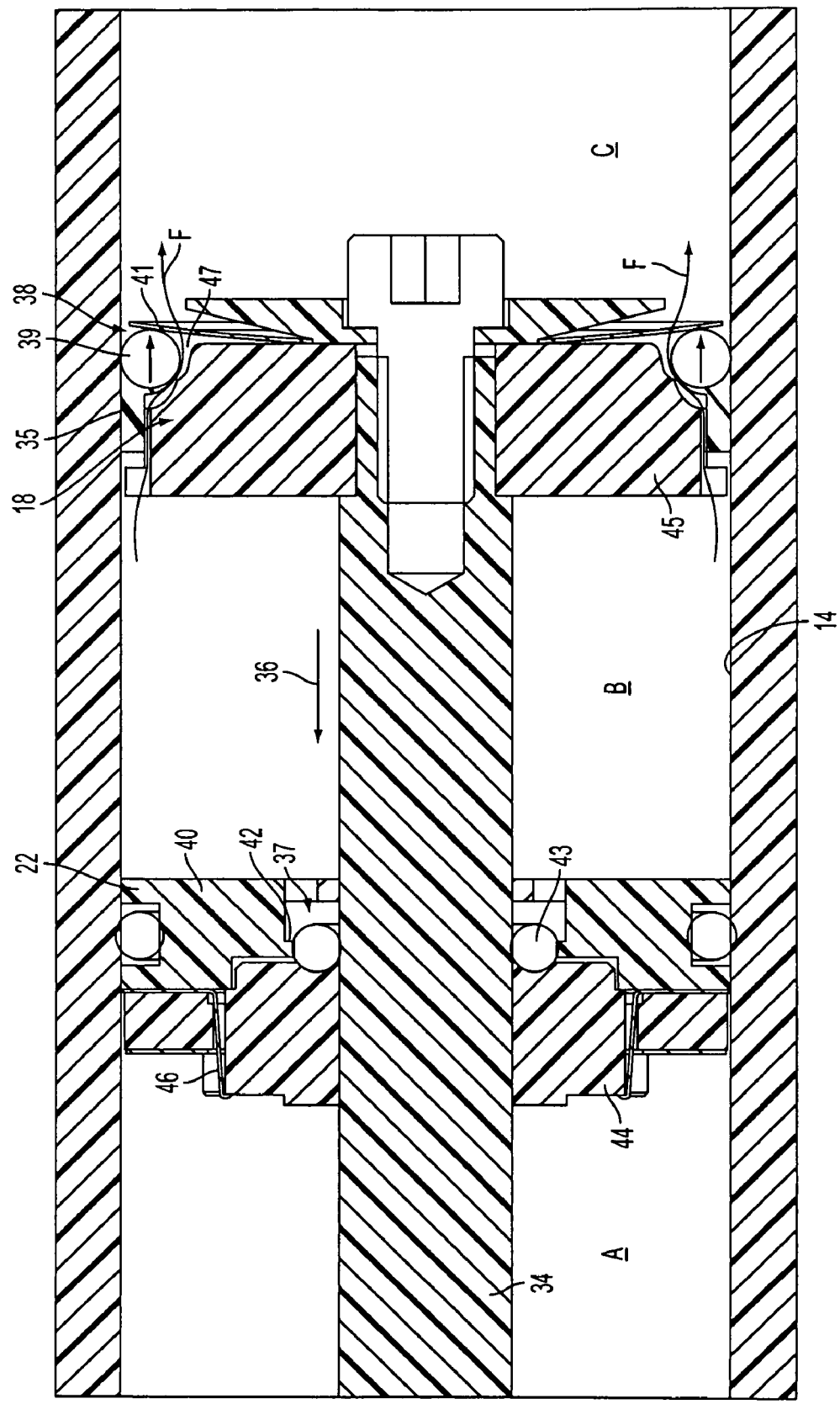
FIG. 2 is a cross-sectional view of a barrier assembly and ram piston assembly of the device of FIG. 1, shown with a seal valve structure of the ram piston assembly open and valve assembly of the barrier assembly closed, with the ram piston assembly being driven to the left.

In accordance with the principles of the invention, an improved barrier assembly 22 and ram piston assembly 18 is provided so as to enable the ram piston assembly 18 to advance rapidly on work (not shown) associated with an end 32 of the rod 34 of the ram piston assembly 18. With reference to FIG. 2, the positive displacement pump piston 20 (FIG. 1) pressurizes fluid in pump chamber D which communicates with driving chamber C and causes fluid in driving chamber C to drive the ram piston assembly 18 in the direction of arrow 36. The barrier assembly 22 stops the flow of fluid from the reservoir B to the accumulator A due to valve assembly, generally indicated at 37, being closed. In particular, the barrier assembly 22 receives the rod 34 so that the rod can move with respect thereto. The barrier assembly 22 includes a seal plate 40, having a land 42, and a barrier gate 44 movable with respect to the seal plate 40. In a closed position of the valve assembly 37, a seal member 43, preferably in the form of an O-ring, is squeezed between the land 42, an outside diameter of the rod 34, and barrier gate 44 to prevent fluid from flowing from reservoir B to accumulator A. A latch spring 46 keeps the barrier gate 44 against the seal plate 40. The land 42 and the durometer of the O-ring 43 ensure a proper compression and sealing of the O-ring 43.

Fluid on the rod side (in reservoir B) of the ram piston assembly 18 experiences incrementally higher pressure since the area of the rod side of the ram piston assembly 18 is less than the front side (in chamber C) thereof by the cross-sectional are of the rod 34. Consequently, fluid on the rod side is displaced by the rapidly advancing ram piston assembly 18 and is forced from the reservoir B to the driving chamber C. This is achieved due to pressure differences between chamber C and reservoir B which causes a seal valve structure, generally indicated at 38, associated with the ram piston assembly 18, to open. The seal valve structure 38 includes a seal member, preferably in the form of an O-ring 39, a back-up member or ring 35, and a spring 41 that biases the O-ring to a closed position between a surface of the inner bore 14 and a portion of a piston 45. Thus, when pressure of the fluid in reservoir B overcomes the bias of spring 41 on O-ring 39, fluid F flows from the reservoir B through a fluid passage 47 in the ram piston assembly 18 and into the driving chamber C. As can be appreciated, the ram piston assembly 18 is driven by the cross-sectional area of the rod 34. The back-up member 35 can be separate from or integral with the piston 45. In the embodiment, the back-up member 35 has an arc-shaped portion and the O-ring 39 has a circular cross-section and is disposed between the spring 41 and the arc-shaped portion of the back-up member 35.

Figure 3:
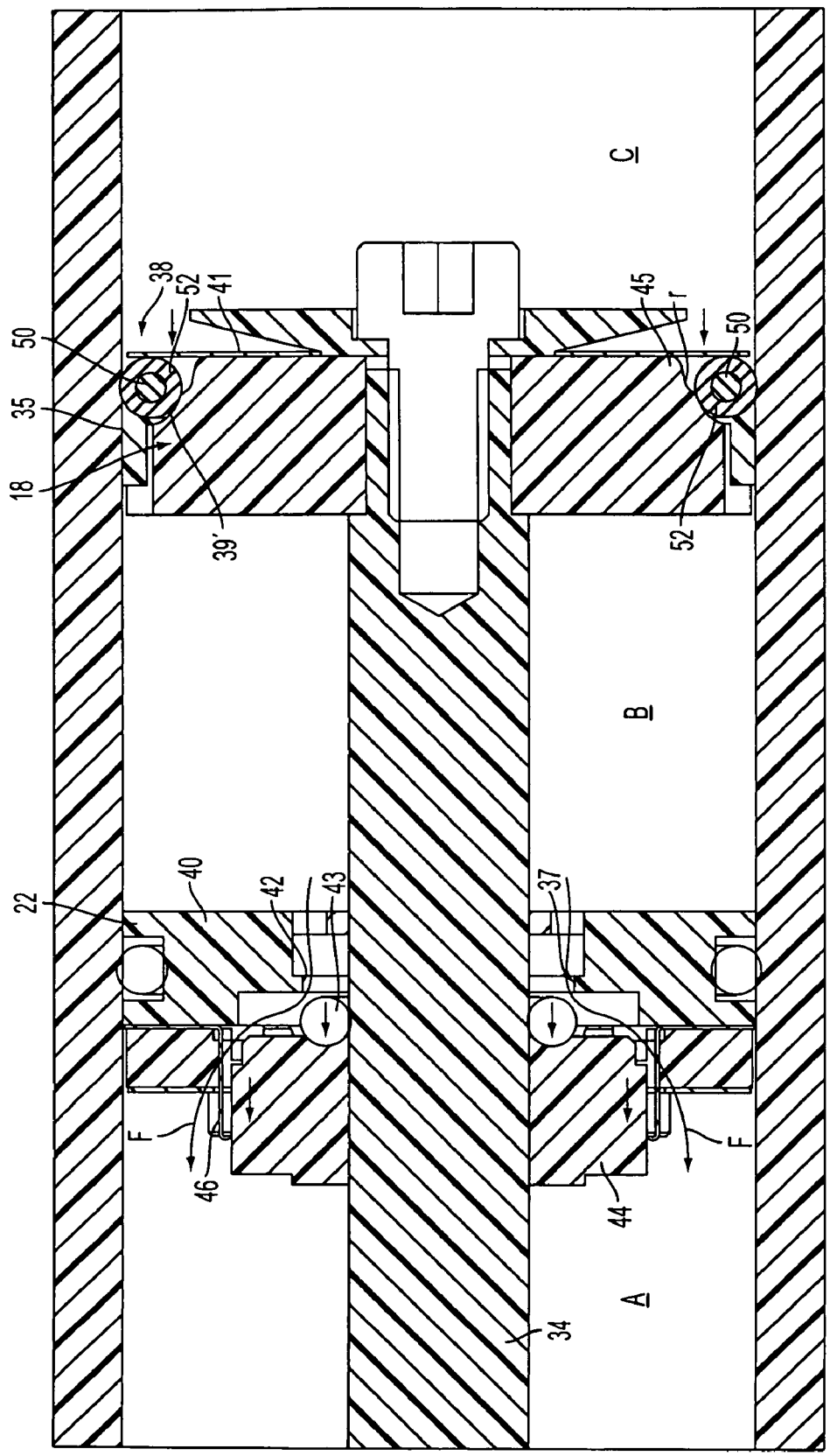
FIG. 3 is a cross-sectional view of the barrier assembly and ram piston assembly of FIG. 1, shown with a seal valve structure of the ram piston assembly closed and valve assembly of the barrier assembly open, permitting fluid to flow from a reservoir to an accumulator.

With reference to FIG. 3, as the ram piston assembly 18 (e.g., rod 34) engages the work, resistance and pressure build in chambers B and C. At a predetermined pressure, the valve assembly 37 opens instantaneously. In particular, the pressure on the seal member 43 pushes the barrier gate 44 to the left in FIG. 3 until the latch spring 46 snaps open. This opens the valve assembly 37 causing fluid F in the reservoir B to move to the accumulator A, with the ram piston assembly 18 being driven by the cross-sectional area of the piston 45 (area exposed to chamber C).

Since pressure is decreasing in the reservoir B, due to pressure differences between chamber C and reservoir B, the valve structure 38, associated with the ram piston assembly 18, closes, preventing fluid communication between reservoir B and driving chamber C.

Later, when the shaft 34 moves to the right (see FIG. 3), due to friction forces, the latch spring 46 will be reset to keep the seal valve assembly 37 closed until opened by the seal member 43 once again as discussed above.

Figure 4:
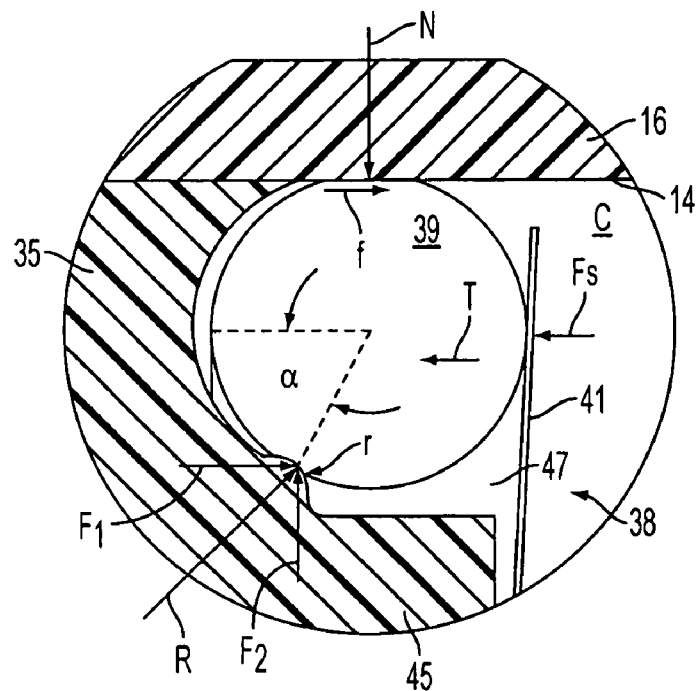
FIG. 4 is a view of an O-ring of a seal valve structure of a ram piston assembly of an embodiment of the invention, shown at a tipping point, when hydraulic force takes over moving the O-ring.

With reference to FIG. 4, the seal valve structure 38 is a check valve that prevents fluid back flow. With the seal valve structure 38 having a seal member in the form of an O-ring 39, a tipping point is defined as the point when hydraulic back-pressure alone (in chamber C) causes the O-ring 39 to move in the direction of arrow T to fully close the seal valve structure 38.

It has been determined that a precondition to achieving the tipping point includes ensuring that the O-ring 39 be tight in the inner bore 14. This is shown in FIG. 4. Fs is the spring force provided to initiate the closing of the seal valve structure 38 and to hold the O-ring 39 against a seal radius (r). It is important that the spring force be as low as possible so that the seal valve structure 38 (e.g., O-ring 39) will open with less effort.

The radius (r) of the piston 45 that extends into the fluid passage 47 is also a factor in both the upper and lower limiting value of (R), a resultant force vectors of forces F1 and F2 as explained below, to control the tipping point. A value of (r) of 0.015 inches has been used. An acceptable value of (r) has been found to range from about 0.010 to 0.020 inches. The radius (r) defines a seal portion of the piston 45. The value of the spring force Fs is reproduced as F1 when the O-ring 39 presses against the radius (r). Based on the angle $\alpha$, secondary force F2 results. The vector addition of F1 and F2 equals the value of the resultant (R). The force (Fs) required to move the O-ring up to the seal position in a 5/8" bore cylinder was found to be 0.156 pounds.

The vector forces used calculating R are:

N—The normal force of the O-ring 39 against the cylinder wall 14 f—The coefficient of friction

Fs—The spring force $\alpha$—The angle to the seal area (r)

R—The resultant of vector forces

The value of (R) in FIG. 4 has a range of acceptable values. The lower limit is the force required to get a continuous firm contact around the torus defined by (r). Without firm contact of the portion (r) of piston 45 pressing into a surface of the O-ring 39 beyond the micro hills and valleys thereof, the seal valve structure 38 will leak and the pressure will not build to finish closing the seal valve structure 38. Too high a force (R) could damage the O-ring 39.

The following calculation was used to determine the value of (R).

1. $R \cos \alpha = Fs - N*f$
2. $R = Fs - N*f / \cos \alpha$
3. $R \sin \alpha = N$
4. $R = N / \sin \alpha$ Combining 2 & 4:

5. $(Fs - N*f) / \cos \alpha = N / \sin \alpha$

Combining the trig terms:

6. $(\cos \alpha / \sin \alpha) = (Fs - N*f) / N$ when $\alpha = 60$ degrees:

7. $(Fs - N*f) / N = 0.5 / 0.866 = 0.577$
8. $Fs = 0.577 N + N*f$ when $f = 0.2$ 9. $Fs = 0.577 N + 0.2 N = 0.777 N$ Since Fs was measured to be 0.156 lbs:

10. $0.777 N = 0.156$ and $N = 0.156 / 0.777 = 0.20$
$R = N / \sin \alpha = N / 0.866 = 0.232$ pounds
Thus, $R = 0.232$ pounds The calculations show that spring force Fs results in the force (R) required to close the valve and move the O-ring 39 from the tipping point into to a pocket of the back-up member 35 to seal the fluid passage 47. It is apparent in FIG. 4 that the value F2 and hence (R) can be changed by changing the angle $\alpha$. This is independent of the value of F1.

This is the resulting force (R) is based on the assumed geometry. It is the force that must be considered to balance the force required to seal the O-ring 39 to the surface of the piston 45, and the acceptable fiber stress limit of the O-ring 39.

It can be appreciated that the size of the parts could vary with out deviating from the intent of the disclosure.

The O-ring could have a different shape, a different durometer, or have a special coating. A 70 durometer is common. For best results, a higher or lower value of (R) would be required to match a higher or lower durometer and or a soft surface.

Figure 5:
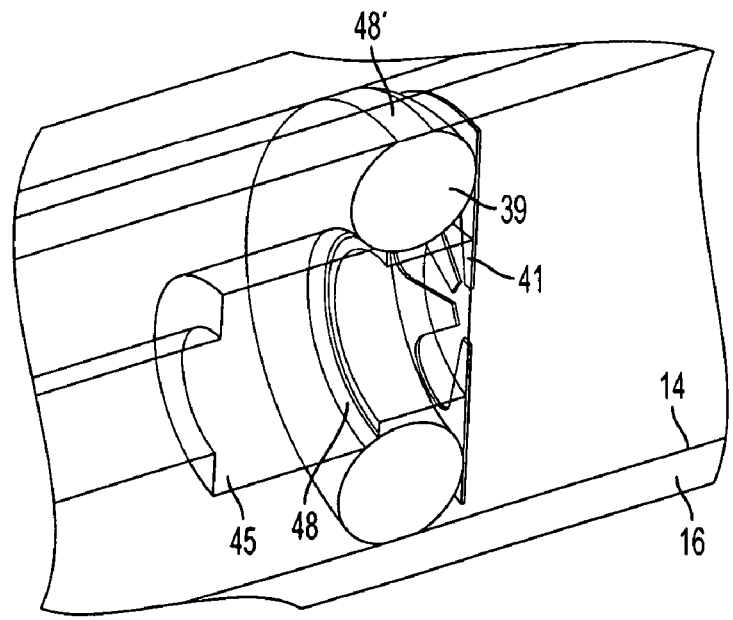
FIG. 5 shows the contact bands of the O-ring of FIG. 4 at the tipping point.

FIG. 5 shows the contact bands 48, 48' on the O-ring 39 at the tipping point. More particularly band 48 shows the contact of the O-ring 39 with the portion of the piston 45 and band 48' shows the contact of the O-ring 39 with the surface of the inner bore 14. In the above analyses, the small friction forces that are present have been ignored. The back-up member 35 is not shown in FIG. 5.

The durometer of the elastomer O-ring 39 affects the tipping point of the seal valve assembly 38. More particularly, a softer and/or tackier O-ring material may be used to delineate a specific tipping point. In an example embodiment, the O-ring can be made of two different materials or of two different durometers. With reference to FIG. 3, the O-ring 39' has a core 50 of conventional material and an outer layer 52 of material softer that the core that facilitates the transition between the opened and closed states of the associated valve. The O-ring 39' can be made, for example, by dip coating a conventional O-ring or by an insert molding process.

Although the O-rings described herein are preferably of circular cross-section, any desired cross-sectional shape of the O-rings can be employed.

In order to manufacture the device 10 with low cost such that the device may be disposable, parts such as, for example, the housing 16, bulkhead 12, piston 18 and rod 28, barrier 22 and accumulator piston 30 are preferably molded from plastic material. Preferably, these parts are molded from an engineered thermoplastic resin, as determined by the mechanical properties needed by individual components (different flexural moduli, hoop strength, or coefficient of friction, etc.). In addition, the non-coil spring of the device 10, such as, for example, the latch spring 46 can be formed by stampings to reduce manufacturing costs. Molding processes for the plastic parts can include, but are not limited to injection molding and insert molding. It is noted that elements in FIG. 4 are not cross-hatched as plastic material for clarity of illustration.

Plastic material can advantageously be used in the device 10, since pressure differences that occur in the chambers A, B, C, D and E are relatively low. Thus, the pressures involved are not sufficient to deform or otherwise cause the plastic parts to fail.

It can be appreciated that due to the fast acting of the valve assembly 37 and seal valve structure 38, the ram piston assembly 18 can be advanced rapidly to engage work.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A seal valve arrangement for a hydraulic device, the hydraulic device having surfaces defining an inner bore, seal valve arrangement comprising:

an element disposed in the bore, the element being constructed and arranged to define a fluid passage so fluid can move from one side thereof to a side opposite the one side, an elastomer seal member disposed generally adjacent to the fluid passage and to a seal portion of the element, and a spring member biasing the seal member to engage the seal portion of the element to maintain sealing of the fluid passage under certain fluid pressure conditions, and under different fluid pressure conditions, to permit the seal member disengage from the seal portion of the element to open the fluid passage to permit fluid to flow there-through, wherein a tipping point is defined as a point when a fluid pressure condition alone causes the seal member to fully engage the seal portion of the element and fully seal the fluid passage, the tipping point being determined by the following relationships:

$$(\cos \alpha / \sin \alpha) = (Fs - N*f) / N, \text{ and}$$

$$R = N / \sin \alpha$$

wherein:

N—a normal force of the seal member against the inner bore f—a coefficient of friction Fs—a force of the spring member on the seal member $\alpha$—an angle to the portion of the element R—a resultant of vector forces at the portion of the element.

2. The arrangement of claim 1, further comprising a back-up member, the seal member disposed between the spring member and the back-up member.

3. The arrangement of claim 1, wherein the seal member is an O-ring.

4. The arrangement of claim 3, further comprising a back-up member having an arc-shaped portion, the O-ring having a circular cross-section and being disposed between the spring member and the arc-shaped portion of the back-up member.

5. The arrangement of claim 4, wherein the back-up member is separate from the element.

6. The arrangement of claim 1, wherein the seal portion of the element is a radiused portion extending into the fluid passage.

7. The arrangement of claim 6, wherein the element is a piston.

8. The arrangement of claim 6, wherein the radiused portion has a radius in the range from about 0.010 to 0.020 inches.

9. The arrangement of claim 1, wherein the seal member has a core of a certain hardness an outer layer over the core, the outer layer having a hardness that is softer than the certain hardness.

10. The arrangement of claim 7, wherein the seal member is an O-ring.

11. A method of ensuring sealing of a fluid passage in a hydraulic device, the hydraulic device having surfaces defining an inner bore, the method comprising:
   providing an element in the bore, the element defining a fluid passage in the bore so fluid can move from one side of the element to another side of the element,
   providing an elastomer seal member generally adjacent to the fluid passage and to a seal portion of the element, and
   biasing the seal member so as to engage with the seal portion of the element to maintain sealing of the fluid passage under certain fluid pressure conditions, and under different fluid pressure conditions, permitting the seal member to disengage from the seal portion of the element to open the fluid passage to permit fluid to flow there-through,
   a tipping point being defined as a point when a fluid pressure condition alone causes the seal member to fully engage the seal portion of the element and fully seal the fluid passage, the method further including:
   determining the tipping point by the following relationships:

$(\cos \alpha/\sin \alpha) = (Fs - N*f)/N$, and $R = N/\sin \alpha$ wherein:
N—a normal force of the seal member against the inner bore
f—a coefficient of friction
Fs—a force of the spring member on the seal member
$\alpha$—an angle to the portion of the element
R—a resultant of vector forces at the portion of the element.

12. The method of claim 11, wherein the step of providing the element includes providing the seal portion of the element as a radiused portion extending into the fluid passage.

13. The method of claim 11, wherein the step of providing the element includes providing the element as a piston made of plastic.

14. The method of claim 12, wherein the radiused portion has a radius in the range from about 0.010 to 0.020 inches.

15. The method of claim 11, wherein step of providing the seal member includes providing the seal member to have a core of a certain hardness an outer layer over the core, the outer layer having a hardness that is softer than the certain hardness.

16. The method of claim 11, wherein the seal member is an O-ring.

17. The method of claim 15, wherein the seal member is an O-ring.

18. A seal valve arrangement for a hydraulic device, the hydraulic device having an element and a member, with a fluid passage defined between the element and the member, the seal arrangement comprising:
   an elastomer seal member between the element and the member so as to be within the fluid passage,
   a movable back-up member between the element and the member, the back-up member having a first surface engageable with the seal member and a second surface, opposite the first surface, engageable with a surface of the element, and
   a spring member,
   wherein the seal member is disposed between the spring member and the back-up member, and
   wherein the spring member biases the seal member together with the back-up member so that both the seal member and the second surface of the back-up-member engage the surface of the element to maintain sealing of the fluid passage under certain fluid pressure conditions, and under different fluid pressure conditions, the spring member permits the seal member and the back-up member to move and disengage from the surface of the element to open the fluid passage to permit fluid to flow there-through.

19. The seal valve arrangement of claim 18, in combination with the element and the member, the member being a housing and the element being a piston movable within the housing.

20. The seal valve arrangement of claim 18, wherein seal member is an O-ring having a circular cross-section and the first surface of the back-up member has an arc-shaped portion engaged with the O-ring when the O-ring and the second surface of the back-up member are engaged with the element.

* * * * *